(12) United States Patent
Philipp et al.

(10) Patent No.: US 11,571,725 B2
(45) Date of Patent: Feb. 7, 2023

(54) LOCALIZATION OF DEBRIS ON OPTICAL SURFACE OF VEHICLE

(71) Applicant: GM Global Technology Operations LLC, Detroit, MI (US)

(72) Inventors: Tzvi Philipp, Herzliya (IL); Julien P. Mourou, Bloomfield Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 269 days.

(21) Appl. No.: 17/106,824

(22) Filed: Nov. 30, 2020

(65) Prior Publication Data

US 2022/0168789 A1   Jun. 2, 2022

(51) Int. Cl.
| | |
|---|---|
| *B08B 17/02* | (2006.01) |
| *B60S 1/56* | (2006.01) |
| *B60S 1/48* | (2006.01) |
| *B60S 1/52* | (2006.01) |
| *B60S 1/54* | (2006.01) |
| *G01S 7/497* | (2006.01) |
| *B60S 1/08* | (2006.01) |
| *G02B 27/00* | (2006.01) |
| *G01S 17/931* | (2020.01) |

(52) U.S. Cl.
CPC ............. *B08B 17/02* (2013.01); *B60S 1/485* (2013.01); *B60S 1/52* (2013.01); *B60S 1/54* (2013.01); *B60S 1/56* (2013.01); *G01S 7/497* (2013.01); *B60S 1/0888* (2013.01); *G01S 17/931* (2020.01); *G01S 2007/4977* (2013.01); *G02B 27/0006* (2013.01)

(58) Field of Classification Search
CPC ............. G01S 2007/4977; G01S 7/497; G01S 17/931; B60S 1/56; B60S 1/0818; B60S 1/54; B60S 1/485; B08B 7/028; B08B 1/00; B08B 5/02; B08B 3/02; G02B 27/0006; B60R 11/04
USPC .................................. 15/250.001; 134/57 R
See application file for complete search history.

(56) References Cited

U.S. PATENT DOCUMENTS

2015/0089754 A1 *  4/2015  Chan ....................... A47L 13/40
                                                      15/94
2018/0009418 A1 *  1/2018  Newman ................... B08B 3/02

* cited by examiner

*Primary Examiner* — Katina N. Henson
(74) *Attorney, Agent, or Firm* — Cantor Colburn LLP

(57) ABSTRACT

A system to localize debris on an optical surface of a vehicle includes a first array along a first side of a perimeter of the optical surface and including a light source to emit light into a thickness of the optical surface. A second array is along a second side of the perimeter, opposite the first side, and includes a light detector to detect light scatter in the thickness and provide a corresponding output. A third array is along a third side of the perimeter and includes a light source to emit light. A fourth array is along a fourth side of the perimeter, opposite the third side, and includes a light detector to detect light scatter and provide a corresponding output. A controller identifies a presence of the debris, determines a position of the debris based on the output from the light detectors, and remediates the debris.

20 Claims, 4 Drawing Sheets

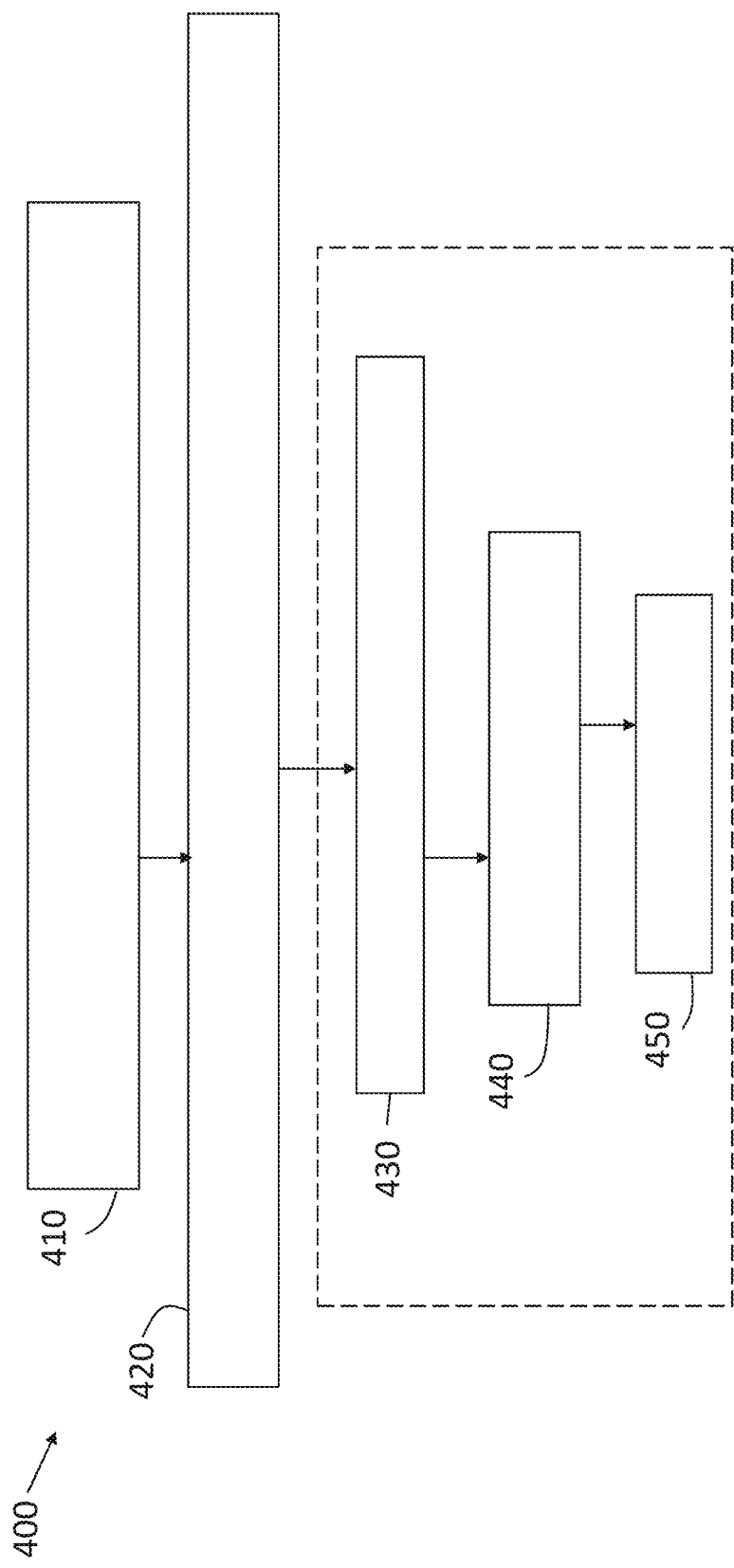

LOCALIZATION OF DEBRIS ON OPTICAL SURFACE OF VEHICLE

The subject disclosure relates to optical sensing of debris and, more particularly, to the localization of debris on an optical surface of a vehicle.

Vehicles (e.g., automobiles, trucks, farm equipment, construction equipment, automated factory equipment) include sensors that facilitate increasing levels of autonomy. Some sensors (e.g., wheel speed sensor, inertial measurement unit) provide information about the vehicle while other sensors (e.g., camera, radar system, lidar system, temperature sensor) provide information about the environment around the vehicle. A vehicle with an advanced driver-assistance system (ADAS) or a fully autonomous vehicle (AV) requires accurate sensor information for safe operation of the vehicle. A sensor (e.g., lidar system) that is located within the vehicle, such as in the passenger compartment, but perceives information outside the vehicle may perform transmission and/or reception through the windshield, rear window, behind fascia, headlamps, or through any other optical surface of the vehicle. Accordingly, it is desirable to provide localization of debris on an optical surface of a vehicle.

SUMMARY

In one exemplary embodiment, a system to localize debris on an optical surface of a vehicle includes a first array arranged along a first side of a perimeter of the optical surface, the first array including one or more light sources to emit light into a thickness of the optical surface. The optical surface is defined by the perimeter, a first surface, a second surface opposite the first surface, and a thickness between the first surface and the second surface. A second array along a second side of the perimeter, opposite the first side, of the optical surface includes one or more light detectors to detect light scatter in the thickness of the optical surface and provide a corresponding output. A third array arranged along a third side of the perimeter includes one or more light sources to emit light into the thickness of the optical surface, and a fourth array arranged along a fourth side of the perimeter, opposite the third side, of the optical surface includes one or more light detectors to detect light scatter in the thickness of the optical surface and provide a corresponding output. The system also includes a controller to identify a presence of the debris and determine a position of the debris on the first surface of the optical surface based on the output from the one or more light detectors of the second array and the fourth array. The controller is configured to remediate the debris.

In addition to one or more of the features described herein, the controller obtains a baseline output from each light detector corresponding with every light source for which the light detector detects light scatter.

In addition to one or more of the features described herein, the controller identifies the presence of the debris based on a decrease in the output as compared to the baseline output from at least one of the one or more light detectors of the second array or at least one of the one or more light detectors of the fourth array.

In addition to one or more of the features described herein, the controller determines the position of the debris based on an intersection of the light scatter giving rise to output below the baseline output.

In addition to one or more of the features described herein, each light source is a light emitting diode or a laser.

In addition to one or more of the features described herein, each light detector is a one-dimensional position sensitive detector (PSD) or a photodetector.

In addition to one or more of the features described herein, the first array also includes one or more light detectors, and the second array also includes one or more light sources.

In addition to one or more of the features described herein, the optical surface is a windshield, the thickness is an outer layer among three layers, and the windshield includes a pattern of wires in a middle layer among the three layers.

In addition to one or more of the features described herein, the controller remediates the debris by powering one or more of the wires to generate heat.

In addition to one or more of the features described herein, the controller remediates the debris by controlling emission of a liquid or a gas from one more nozzles along the perimeter of the windshield.

In another exemplary embodiment, a method of assembling a system to localize debris on an optical surface of a vehicle includes arranging a first array arranged along a first side of a perimeter of the optical surface. The first array includes one or more light sources configured to emit light into a thickness of the optical surface. The optical surface is defined by the perimeter, a first surface, a second surface opposite the first surface, and a thickness between the first surface and the second surface. A second array is arranged along a second side of the perimeter, opposite the first side, of the optical surface. The second array includes one or more light detectors configured to detect light scatter in the thickness of the optical surface and provide a corresponding output. A third array is arranged along a third side of the perimeter, the third array including one or more light sources configured to emit light into the thickness of the optical surface. A fourth array is arranged along a fourth side of the perimeter, opposite the thirds side, of the optical surface, the fourth array including one or more light detectors configured to detect light scatter in the thickness of the optical surface and provide a corresponding output. The method also includes configuring a controller to identify a presence of the debris and determine a position of the debris on the first surface of the optical surface based on the output from the one or more light detectors of the second array and the fourth array and to remediate the debris.

In addition to one or more of the features described herein, the configuring the controller includes the controller obtaining a baseline output from each light detector corresponding with every light source for which the light detector detects light scatter.

In addition to one or more of the features described herein, the configuring the controller includes the controller identifying the presence of the debris based on a decrease in the output as compared to the baseline output from at least one of the one or more light detectors of the second array or at least one of the one or more light detectors of the fourth array.

In addition to one or more of the features described herein, the configuring the controller includes the controller determining the position of the debris based on an intersection of the light scatter giving rise to output below the baseline output.

In addition to one or more of the features described herein, the arranging the first array and the arranging the third array includes arranging the one or more light sources that are each a light emitting diode or a laser.

In addition to one or more of the features described herein, the arranging the second array and the arranging the fourth array includes arranging the one or more light detectors that are each a one-dimensional position sensitive detector (PSD) or a photodetector.

In addition to one or more of the features described herein, the arranging the first array additionally includes arranging one or more light detectors, and the arranging the second array additionally includes arranging one or more light sources.

In addition to one or more of the features described herein, the optical surface is a windshield, the thickness is an outer layer among three layers, and the windshield includes a pattern of wires in a middle layer among the three layers.

In addition to one or more of the features described herein, the configuring the controller to remediate the debris includes the controller powering one or more of the wires to generate heat.

In addition to one or more of the features described herein, the configuring the controller to remediate the debris includes the controller controlling emission of a liquid or a gas from one more nozzles along the perimeter of the windshield.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which:

FIG. 4 is a process flow of a method of localizing debris on an optical surface according to one or more embodiments.

DETAILED DESCRIPTION

Figure 1:
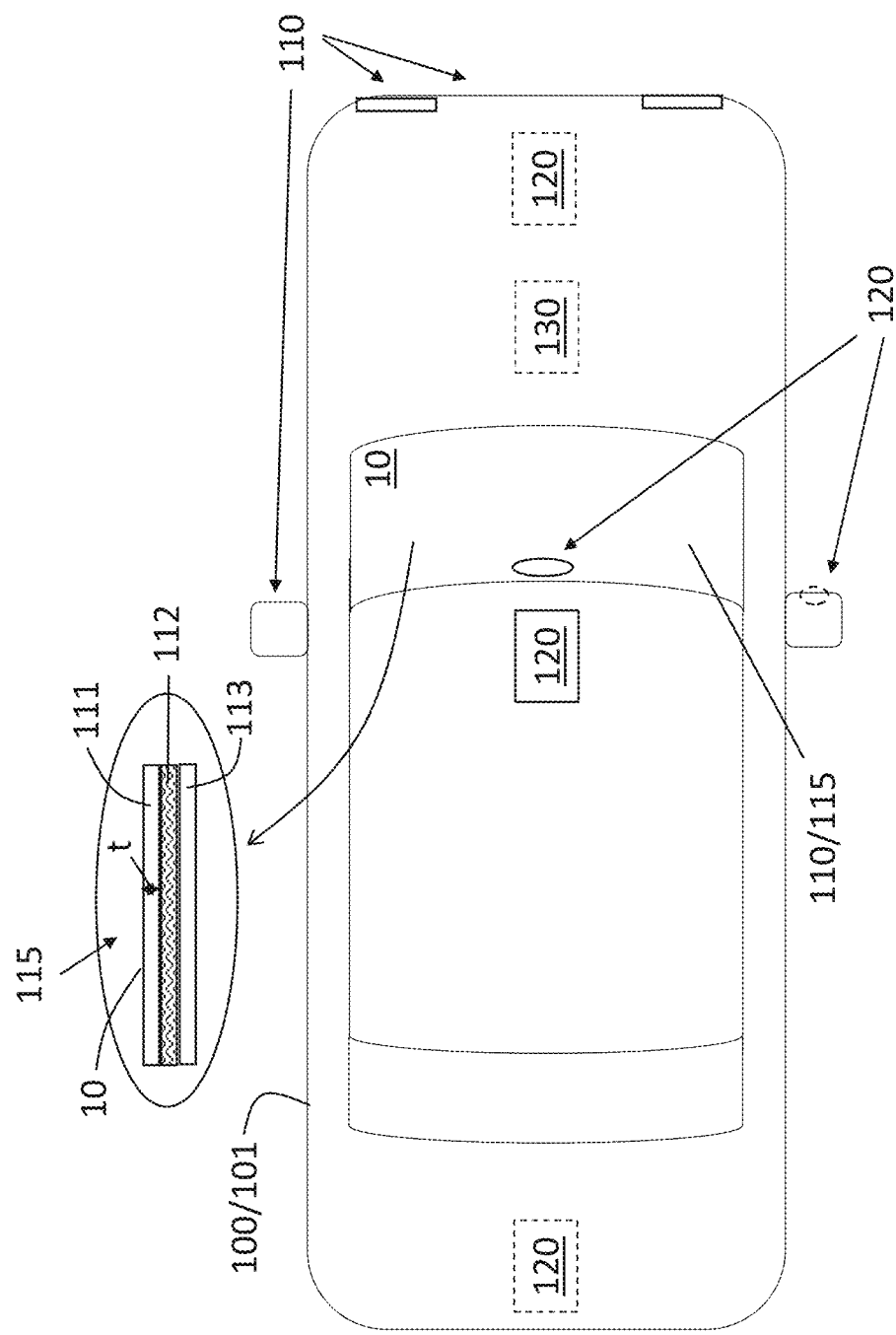
FIG. 1 is a block diagram of a vehicle that includes localization of debris on an optical surface according to one or more embodiments.

The following description is merely exemplary in nature and is not intended to limit the present disclosure, its application or uses. It should be understood that throughout the drawings, corresponding reference numerals indicate like or corresponding parts and features.

As previously noted, vehicles, especially those with ADAS or AVs, may rely on sensor information for proper operation. In general, sensors may be located behind any window, fascia, headlamp, vehicle grill, side view mirror, or other optical surface (i.e., optically transparent surface). For example, a lidar system may emit light through the windshield of the vehicle and receive reflected light at a co-located detector. Debris on the windshield may affect proper transmission of the light and result in an incorrect detection. Even when the sensor location is behind a windshield or other location that may be visually inspected by a human, the debris that affects proper operation of the sensor may be imperceptible to the human or to a rain-sensing wiper system on the windshield, for example. According to a prior approach, detection of the presence of debris somewhere on the windshield may result in activation of the windshield wipers. However, depending on the location and adhesion of the debris, this remediation may prove ineffective. Other remediation methods may be inefficient when they must be applied to the entire optical surface.

Embodiments of the systems and methods detailed herein relate to localization of debris on an optical surface of a vehicle. This localization facilitates localized remediation to remove the debris. Localized remediation is more efficient and may be more effective than an approach that cleans the entire optical surface. In the case of an electric vehicle, for example, less waste heat is generated than in the case of a vehicle with an internal combustion engine. Thus, energy from the battery is diverted to functions such as interior heating, ice removal, and defrosting. By localizing the debris, removal through heat, washing, application of air pressure, or another approach minimizes energy usage.

Figure 2:
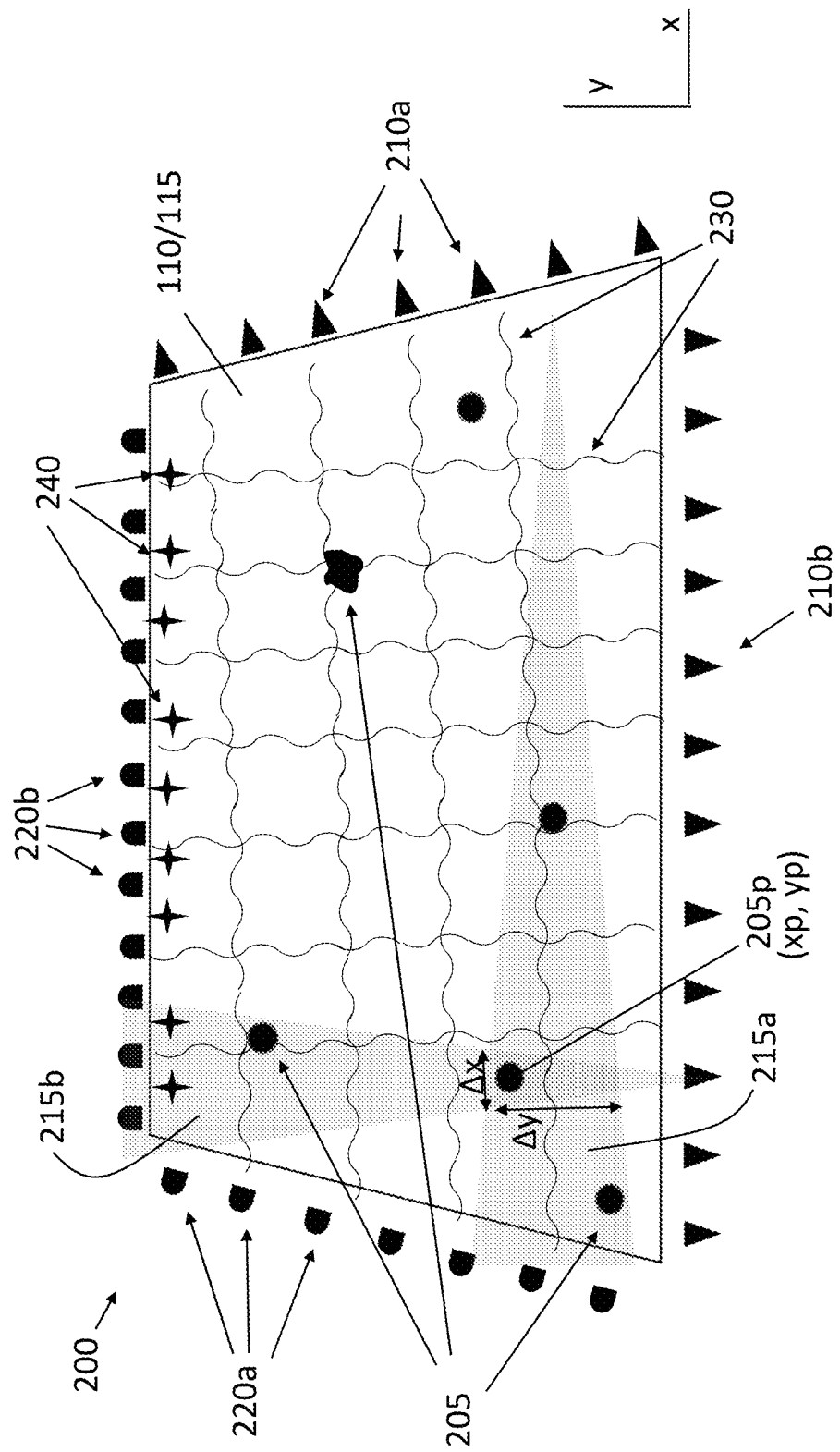
FIG. 2 details aspects of a system to localize and remediate debris on an optical surface according to one or more embodiments.

In accordance with an exemplary embodiment, FIG. 1 is a block diagram of a vehicle 100 that includes localization of debris on an optical surface 110. The exemplary vehicle 100 shown in FIG. 1 is an automobile 101. An exemplary optical surface 110 indicated in FIG. 1 is the windshield 115. A cross-sectional view through the thickness of an exemplary windshield 115 is shown. The cross-sectional view reveals three layers of the exemplary windshield 115. An outer glass layer 111 is the outermost layer, and the environment outside the vehicle 100 contacts an outer surface 10 of the outer glass layer 111. A thickness t of the outer glass layer 111 is indicated. A middle layer 112 is a polyvinyl layer. As shown in FIG. 2, wires 230 may be formed in this middle layer 112. An inner glass layer 113 is the innermost layer of the exemplary windshield 115, and the environment of the passenger compartment of the vehicle 100 contacts one side of the glass layer 113.

Other exemplary optical surfaces 110 may include the headlamps, side mirror housing, or fascia. The vehicle 100 includes sensors 120 that obtain information about the vehicle 100 and about its environment. Exemplary sensors 120 that obtain information outside the vehicle 100 may include radar systems that are front and rear-facing, cameras such as those used for parking assist, and lidar systems. The exemplary number and location of sensors 120 indicated in FIG. 1 are not intended to limit the numbers or locations according to other embodiments.

A controller 130 of the vehicle 100 obtains information from one or more sensors 120 and performs semi-autonomous or autonomous operation of the vehicle 100. This controller 130 may additionally implement debris remediation according to exemplary embodiments. The controller 130 includes processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

FIG. 2 details aspects of a system 200 to localize and remediate debris 205 on an optical surface 110 according to one or more embodiments. For explanatory purposes, the optical surface 110 discussed with reference to the system 200 will be an exemplary embodiment of a windshield 115 that includes the three layers 111, 112, 113, as shown in FIG. 1. Debris 205 is shown in different areas of the windshield 115. Specifically, debris 205 is on the outer surface 10 of the outer glass layer 111 of the windshield 115.

A first array of light sources 210a is shown along the right side of the windshield 115, and a second array of light sources 210b is shown along the bottom of the windshield 115 according to the orientation in FIG. 2. The light sources 210a, 210b (generally referred to as 210) may be light emitting diodes (LEDs) or lasers, for example. Each array of light sources 210 is arranged such that light is introduced into the outer glass layer 111 (i.e., into a thickness t of the outer glass layer 111). Exemplary light scatter 215a, 215b (generally referred to as 215) resulting from one light source 210a of the first array and one light source 210b of the second array, respectively, are shown. The light emitted by each light source 210 may have a wavelength on the order of 850 nanometers (nm) to 1200 nm. Generally, wavelengths that are not visible to human perception and that generate significant scatter are selected. Different light sources 210 may transmit different wavelengths, as further discussed.

A first array of light detectors 220a is shown along the left side of the windshield 115, across from the first array of light sources 210a, and a second array of light detectors 220b is shown along the top of the windshield 115, across from the second array of light sources 210b, according to the view in FIG. 2. The light detectors 220a, 220b (generally referred to as 220) detect light transmission through the outer glass layer 111 (i.e., within the outer glass layer 111). Each light detector 220 may be a one-dimensional position sensitive detector (PSD) or a photodetector. Each light detector 220 outputs a voltage that is proportional to the detected light intensity. The output of a given light detector 220 represents a volumetric summation of the light scatter 215 through a particular region.

Figure 3:
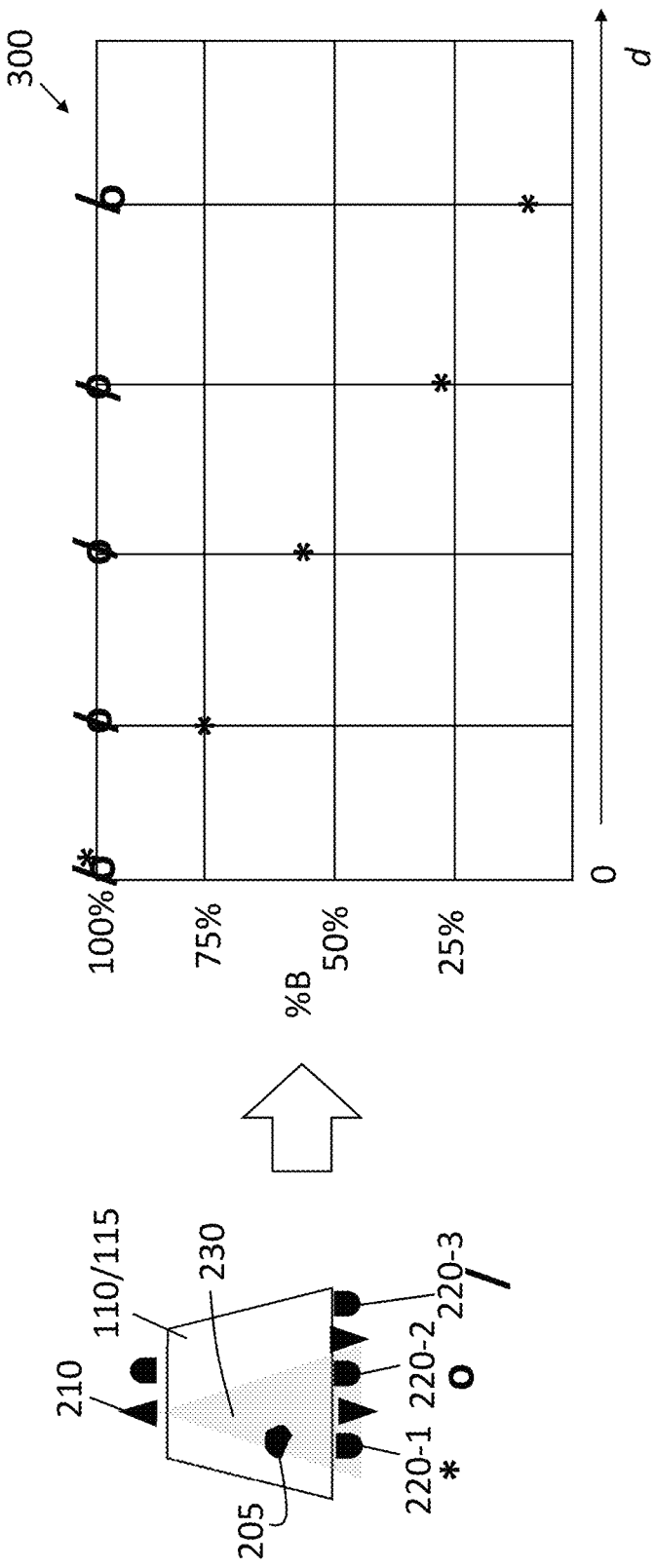
FIG. 3 illustrates the effect of debris and debris density on the output of exemplary light detectors used to localize debris on an optical surface according to one or more embodiments.

The arrangement of the exemplary arrays of light sources 210 and detectors 220 in FIG. 2 is not intended to limit the numbers and arrangements according to alternate embodiments. For example, light sources 210 and light detectors 220 may be alternated within arrays on opposite sides of the optical surface 110 as shown in FIG. 3. The desired localization resolution (which increases with density of the arrays of light sources 210) may be balanced with cost (which also increases with the number of light sources 210 used) to determine the numbers and arrangements of the light sources 210 and light detectors 220. According to an exemplary embodiment, the arrays of light sources 210 and light detectors 220 may be arranged on different sides than those shown in FIG. 2.

In order to facilitate determination of which light source 210 and, thus, which region of light scatter 215 corresponds with detections at a given light detector 220, the light sources 210 may be operated at different times and may be modulated. Specifically, the time of transmission of each light source 210 within a given array and the frequency (i.e., wavelength of transmitted light) may be modulated. In addition, duty cycle (i.e., how often a given light source 210 transmits) may be modulated.

When a light detector 220 is positioned to receive light scatter 215 generated by more than one light source 210, timing and/or frequency modulation of the transmission by each light source 210 may be used to distinguish the received light scatter 215. Timing refers to the fact that each of the light sources 210 within the same array may transmit in turn (e.g., each of the light sources 210b transmits one-at-a-time) rather than simultaneously. This scheme is referred to as time divisional multiple access (TDMA). Alternately, every other or every third (or every nth) light source 210a, 210b may transmit at the same time. Frequency-domain modulation refers to the fact that the wavelength of light transmitted by every light source 210 within the same array may be different. This scheme is referred to as frequency division multiple access (FDMA). Alternately, every second or third (or nth) light source 210 within the same array may transmit light of the same wavelength. The duty cycle modulation may be such that the frequency of transmission (i.e., how often a given light source 210 transmits) is on the order of 10 to 1000 Hertz to allow for relatively long detection times.

As shown in FIG. 2, the light scatter 215a resulting from a light source 210a is detected by two of the light detectors 220a of the first array, and the light scatter 215b resulting from a light source 210b is detected by three of the light detectors 220b of the second array. The debris 205p, which is on the outer surface 10 of the outer glass layer 111 (i.e., the side of the outer glass layer 111 that is opposite the side adjacent to the middle layer 112) interferes with both the light scatter 215a and the light scatter 215b. Thus, the debris 205p may be localized. According to an exemplary embodiment, each light detector 220 may provide localized information on received light scatter 230. Even otherwise, according to the exemplary x, y axes indicated in FIG. 2, a range of x values ($\Delta x$) and a range of y values ($\Delta y$) may be determined for the location (xp, yp) of the debris 205p as the range of x values spanned by the light scatter 215b (which is known) and the range of y values spanned by the light scatter 215a. (which is known) More particularly, knowing the patterns of the light scatter 215a, 215b, the range of x values and y values of the debris 205 may be narrowed down to those representing the intersection of the light scatter 215a with the light scatter 215b.

The outer glass layer 111 has a higher index of refraction than the outside environment on one side of the outer glass layer 111 and has a slightly higher index of refraction than the middle layer 112 on the other (i.e., inner) side of the outer glass layer 111. As a result, light transmitted by a light source 210 into the outer glass layer 111 experiences total internal reflection (i.e., the light does not leave the outer glass layer 111). Because none of the light leaves the outer glass layer 111, all of it reaches one or more light detectors 220 on the opposite side, according to the arrangement shown in FIG. 2.

When debris 205 is on the outer surface 10 of the outer glass layer 111, the index of refraction changes on the corresponding (outer surface 10) side of the outer glass layer 111. This allows some of the light propagating within the outer glass layer 111 to escape the outer glass layer 111. As a result, less light is detected by the one or more light detectors 220. This change in detection (i.e., decrease in the voltage output at the one or more detectors 220) indicates the presence of debris 205. That is, a calibration of the output of each light detector 220 without any debris 205 provides a baseline output by each light detector 220. The baseline output of a given light detector 220 may be obtained corresponding to more than one light source 210 when the light detector 220 is positioned to receive light scatter 215 from more than one light source 210. Then, the presence of debris 205 is identified based on a decrease in the output of one or more light detectors 220 from its baseline (i.e., calibrated) output. An analysis of which light detectors 220 experience the decreased output (and in correspondence with which light source 210) facilitates localization of the debris 205, as further detailed with reference to FIG. 3.

Two exemplary components—wires 230 and nozzles 240—that may be used to remove debris 205 that is identified and localized on the optical surface 110 are shown in FIG. 2. The wires 230, referred to as wiggle wires due to their zig zag pattern, are shown to be arranged in a checkerboard pattern according to an exemplary embodiment. As previously noted, in the exemplary case of the optical surface 110 being a windshield 115, the wires 230 (e.g., tungsten wires) may be disposed in the middle layer 112 and may be used as part of the defrost operation, for example. A controlled transmission of current through the wires 230 causes them to heat. According to exemplary embodiments, the heat may be used to dissolve debris 205 on the windshield 115. Further, by determining the location of the debris 205, power need not be expended to heat all the wires 230. Instead, only the wires in the vicinity of the localized debris 205 may be activated. The nozzles 240 are shown arranged in an array in FIG. 2. The nozzles 240 may be configured to disperse a gas (e.g., air) and/or a liquid (e.g., water, windshield wiper fluid) onto the outer surface of the windshield 115 to dislodge the debris 205 from the outer surface of the windshield 115. Based on localization of the debris 205, only one or a subset of the nozzles 240 may be activated.

FIG. 3 illustrates the effect of debris 205 and debris density on the output of exemplary light detectors 220 used to localize debris 205 on an optical surface 110 according to one or more embodiments. For explanatory purposes, the optical surface 110 is a windshield 115 and only one light source 210 and three light detectors 220-1, 220-2, 220-3 are shown. As illustrated, light detectors 220-1 and 220-2 are positioned to receive some of the light scatter 230 resulting from the light source 210 but the light detector 220-3 does not receive any of the light scatter 230. Debris 205 is shown in FIG. 3. As illustrated, this debris 205 affects the light scatter 230 that light detector 220-1 receives more than it affects the light scatter 230 that light detector 220-2 receives. Each light detector 220 is indicated by a symbol, as shown. On the right, the graph 300 indicates the output of each light detector 220 as a percentage (%) of its baseline output (B) corresponding to the light source 210 shown in FIG. 3. The output of each light detector 220 is also indicated for increasing density (d) of the debris 205.

In the case of the light detector 220-3, the baseline output for the particular light source 210 that is shown in FIG. 3 would be 0 and would remain so (i.e., 100% of that baseline). In the case of the light detector 220-2, the baseline output (B) is mostly unaffected by the debris 205 because of its location relative to the debris 205. In the case of the light detector 220-1, 100% of the baseline output (B) is provided by the light detector 220-1 when the density d of the debris is 0 (i.e., there is no debris 205). However, the percentage of the baseline output (% B) that is provided by the light detector 220-1 decreases proportional to an increase in the density of the debris 205. That is, as the density of the debris 205 increases, the refractive index of the outer glass layer 111 at the outer surface 10 increases, and more of the light scatter 230 that encounters the debris 205 escapes the outer glass layer 111. Consequently, less of the light scatter 230 reaches the light detector 220-1 and the percentage of the baseline output % B provided by the light detector 220-1 decreases as the density of the debris 205 increases, as indicated.

FIG. 4 is a process flow of a method 400 of localizing debris 205 on an optical surface 110 according to one or more embodiments. At block 410, arranging and configuring one or more arrays of light sources 210 and corresponding one or more arrays of light detectors 220 includes using exemplary embodiments like the ones shown in FIGS. 2 and 3. That is, light sources 210 and light detectors 220 may be separated into arrays that are not co-located or may be part of the same arrays. Additionally, configuring the light sources 210, at block 410, refers to determining the wavelength of light transmitted, the duty cycle, and the time of transmission of each light source 210. As previously noted, light sources 210 may be configured to transmit one-at-a-time or in non-adjacent groups.

At block 420, obtaining the baseline output from each light detector 220 corresponding with each light source 210 refers to determining the output (e.g., voltage) from each light detector 220 in the absence of any debris 205. A baseline output is obtained from each light detector 220 corresponding with each light source 210 for which the light detector 220 detects light scatter 230. The number of light sources 210 for which a given light detector 220 will provide a baseline output is based on the location and arrangement of the light detector 220. As previously noted, this baseline facilitates determining the presence of debris 205 based on a decrease in the voltage output of one or more light detectors 220. The process at block 420 may be considered a calibration process for the system 200 to localize and remediate debris 205 on the optical surface 110. The subsequent processes at blocks 430, 440, and 450 are performed continuously (e.g., periodically) during operation of the vehicle 100.

At block 430, obtaining output from each light detector 220 is the first of an iterative process that continues while the vehicle 100 is operating. Each light detector 220 detects light scatter 230 generated by one or more light sources 210 and provides a corresponding output. At block 440, identifying and localizing debris 205 includes the controller 130 comparing the output from each light detector 220 corresponding with a particular light source 210 with the baseline output for that light detector 220 corresponding with that particular light source 210. A decrease in the output suggests the presence of debris 205. Localizing the debris 205 involves correlating the decreased outputs (as compared with the baselines) from two or more light detectors 220, as discussed for the debris 205p with reference to FIG. 2. The arrangement of the light sources 210 and light detectors 220 may determine the resolution with which debris 205 may be localized.

At block 450, remediating the debris 205 may involve using heat via the wires 230 or emitting air or water from nozzles 240 according to exemplary embodiments. The controller 130 may determine which one or more approaches to use based on additional information. For example, the controller 130 may obtain a measurement of outside temperature from one of the sensors 120 to determine the likelihood of the debris 205 being ice that can be melted by applying a current through two or more of the wires 230 in the middle layer 112 of the windshield 115. Based on the optical surface 110, some remedial measures may not be available.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. A system to localize debris on an optical surface of a vehicle, the system comprising:
a first array arranged along a first side of a perimeter of the optical surface, the first array including one or more light sources configured to emit light into a thickness of the optical surface, wherein the optical surface is defined by the perimeter, a first surface, a second surface opposite the first surface, and a thickness between the first surface and the second surface;

a second array arranged along a second side of the perimeter, opposite the first side, of the optical surface, the second array including one or more light detectors configured to detect light scatter in the thickness of the optical surface and provide a corresponding output;

a third array arranged along a third side of the perimeter, the third array including one or more light sources configured to emit light into the thickness of the optical surface;

a fourth array arranged along a fourth side of the perimeter, opposite the third side, of the optical surface, the fourth array including one or more light detectors configured to detect light scatter in the thickness of the optical surface and provide a corresponding output; and a controller configured to identify a presence of the debris and determine a position of the debris on the first surface of the optical surface based on the output from the one or more light detectors of the second array and the fourth array, wherein the controller is configured to remediate the debris.

2. The system according to claim 1, wherein the controller is configured to obtain a baseline output from each light detector corresponding with every light source for which the light detector detects light scatter.

3. The system according to claim 2, wherein the controller is configured to identify the presence of the debris based on a decrease in the output as compared to the baseline output from at least one of the one or more light detectors of the second array or at least one of the one or more light detectors of the fourth array.

4. The system according to claim 3, wherein the controller is configured to determine the position of the debris based on an intersection of the light scatter giving rise to output below the baseline output.

5. The system according to claim 1, wherein each light source is a light emitting diode or a laser.

6. The system according to claim 1, wherein each light detector is a one-dimensional position sensitive detector (PSD) or a photodetector.

7. The system according to claim 1, wherein the first array also includes one or more light detectors, and the second array also includes one or more light sources.

8. The system according to claim 1, wherein the optical surface is a windshield, the thickness is an outer layer among three layers, and the windshield includes a pattern of wires in a middle layer among the three layers.

9. The system according to claim 8, wherein the controller is configured to remediate the debris by powering one or more of the wires to generate heat.

10. The system according to claim 8, wherein the controller is configured to remediate the debris by controlling emission of a liquid or a gas from one more nozzles along the perimeter of the windshield.

11. A method of assembling a system to localize debris on an optical surface of a vehicle, the method comprising:

arranging a first array arranged along a first side of a perimeter of the optical surface, the first array including one or more light sources configured to emit light into a thickness of the optical surface, wherein the optical surface is defined by the perimeter, a first surface, a second surface opposite the first surface, and a thickness between the first surface and the second surface;

arranging a second array along a second side of the perimeter, opposite the first side, of the optical surface, the second array including one or more light detectors configured to detect light scatter in the thickness of the optical surface and provide a corresponding output;

arranging a third array along a third side of the perimeter, the third array including one or more light sources configured to emit light into the thickness of the optical surface;

arranging a fourth array along a fourth side of the perimeter, opposite the third side, of the optical surface, the fourth array including one or more light detectors configured to detect light scatter in the thickness of the optical surface and provide a corresponding output; and configuring a controller to identify a presence of the debris and determine a position of the debris on the first surface of the optical surface based on the output from the one or more light detectors of the second array and the fourth array and to remediate the debris.

12. The method according to claim 11, wherein the configuring the controller includes the controller obtaining a baseline output from each light detector corresponding with every light source for which the light detector detects light scatter.

13. The method according to claim 12, wherein the configuring the controller includes the controller identifying the presence of the debris based on a decrease in the output as compared to the baseline output from at least one of the one or more light detectors of the second array or at least one of the one or more light detectors of the fourth array.

14. The method according to claim 13, wherein the configuring the controller includes the controller determining the position of the debris based on an intersection of the light scatter giving rise to output below the baseline output.

15. The method according to claim 11, wherein the arranging the first array and the arranging the third array includes arranging the one or more light sources that are each a light emitting diode or a laser.

16. The method according to claim 11, wherein the arranging the second array and the arranging the fourth array includes arranging the one or more light detectors that are each a one-dimensional position sensitive detector (PSD) or a photodetector.

17. The method according to claim 11, wherein the arranging the first array additionally includes arranging one or more light detectors, and the arranging the second array additionally includes arranging one or more light sources.

18. The method according to claim 11, wherein the optical surface is a windshield, the thickness is an outer layer among three layers, and the windshield includes a pattern of wires in a middle layer among the three layers.

19. The method according to claim 18, wherein the configuring the controller to remediate the debris includes the controller powering one or more of the wires to generate heat.

20. The method according to claim 18, wherein the configuring the controller to remediate the debris includes the controller controlling emission of a liquid or a gas from one more nozzles along the perimeter of the windshield.

* * * * *